(12) United States Patent
Nishiyama

(10) Patent No.: US 8,994,667 B2
(45) Date of Patent: Mar. 31, 2015

(54) ELECTRONIC DEVICE

(75) Inventor: Shigeki Nishiyama, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 272 days.

(21) Appl. No.: 13/031,126

(22) Filed: Feb. 18, 2011

(65) Prior Publication Data

US 2011/0141049 A1  Jun. 16, 2011

Related U.S. Application Data

(63) Continuation of application No. 12/871,771, filed on Aug. 30, 2010.

(30) Foreign Application Priority Data

Dec. 14, 2009  (JP) .................................. 2009-283168

(51) Int. Cl.
G06F 3/041  (2006.01)

(52) U.S. Cl.
CPC .................................... *G06F 3/0414* (2013.01)
USPC ......... 345/173; 345/156; 345/174; 178/18.01

(58) Field of Classification Search
CPC .. H01L 2924/00; H05K 1/0271; G06F 3/045; G06F 3/0354
USPC .......... 345/173–178; 178/18.01, 18.02–18.07
See application file for complete search history.

(56) References Cited

U.S. PATENT DOCUMENTS

| | | | | |
|---|---|---|---|---|
| 5,228,562 A | * | 7/1993 | Burk | 200/512 |
| 6,093,477 A | * | 7/2000 | Matsufusa et al. | 428/209 |
| 6,304,251 B1 | * | 10/2001 | Ito et al. | 345/173 |
| 6,583,844 B1 | * | 6/2003 | Mishima et al. | 349/149 |
| 7,223,923 B2 | * | 5/2007 | Ho et al. | 174/255 |
| 7,439,962 B2 | * | 10/2008 | Reynolds et al. | 345/173 |
| 7,710,406 B2 | * | 5/2010 | Fujii et al. | 345/173 |
| 2001/0043291 A1 | * | 11/2001 | Kono et al. | 349/12 |
| 2003/0087546 A1 | * | 5/2003 | Hellriegel et al. | 439/457 |
| 2003/0184514 A1 | | 10/2003 | Grosfeld et al. | |
| 2006/0223346 A1 | * | 10/2006 | Fujii et al. | 439/76.2 |
| 2006/0274055 A1 | * | 12/2006 | Reynolds et al. | 345/174 |
| 2007/0030254 A1 | * | 2/2007 | Robrecht et al. | 345/173 |
| 2010/0165466 A1 | | 7/2010 | Endo et al. | |

FOREIGN PATENT DOCUMENTS

| | | |
|---|---|---|
| JP | 2003-296023 A | 10/2003 |
| JP | 2005-063423 A | 3/2005 |

(Continued)

OTHER PUBLICATIONS

Notice of Reasons for Rejection mailed by Japan Patent Office on Oct. 19, 2010 in the corresponding Japanese patent application No. 2009-283168.

(Continued)

*Primary Examiner* — Gregory J Tryder

(74) *Attorney, Agent, or Firm* — Knobbe, Martens, Olson & Bear, LLP

(57) ABSTRACT

According to one embodiment, an L-shaped printed circuit board is connected to the periphery of a film sensor at a plurality of connection portions. Long holes are each formed in the periphery of a film sensor at the center of a portion of the film sensor located between a corresponding pair of adjacent connection portions.

10 Claims, 6 Drawing Sheets

(56) References Cited

FOREIGN PATENT DOCUMENTS

| | | |
|---|---|---|
| JP | 2007-178976 A1 | 7/2007 |
| JP | 2008-234470 A | 10/2008 |

OTHER PUBLICATIONS

Notice of Reasons for Rejection mailed by Japan Patent Office on Mar. 15, 2011 in Japanese patent application No. 2011-025003.

* cited by examiner

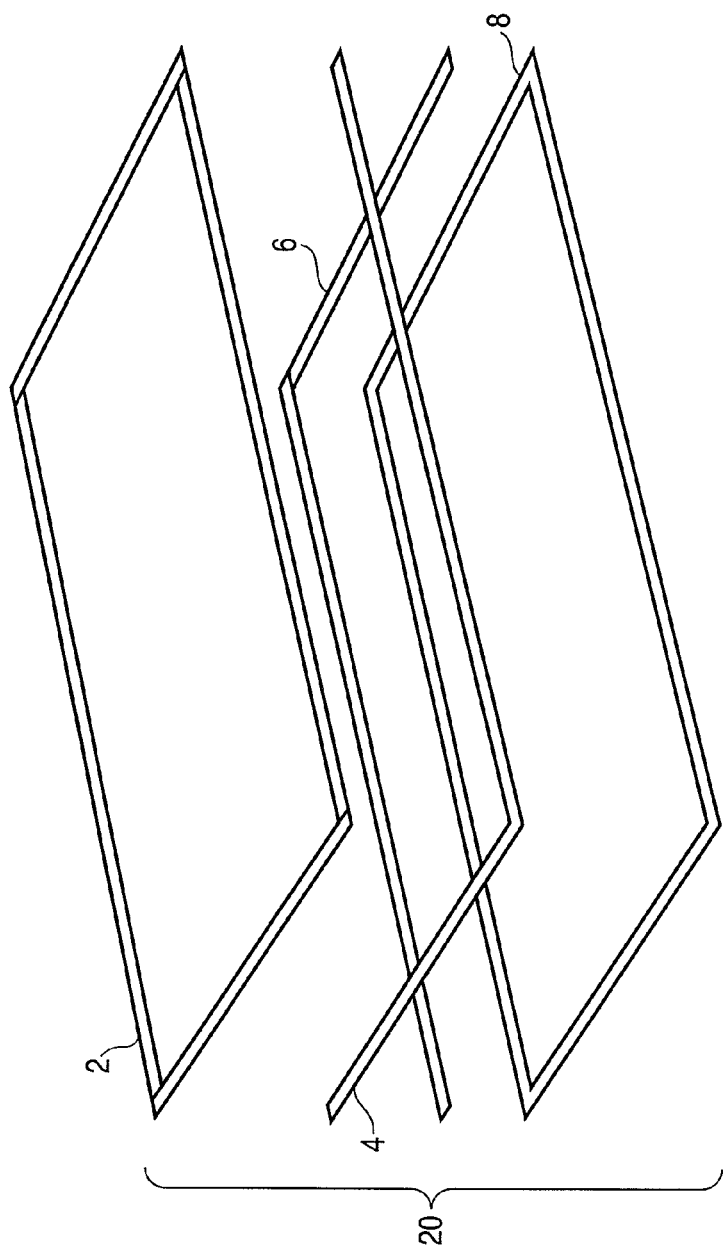
F I G. 4

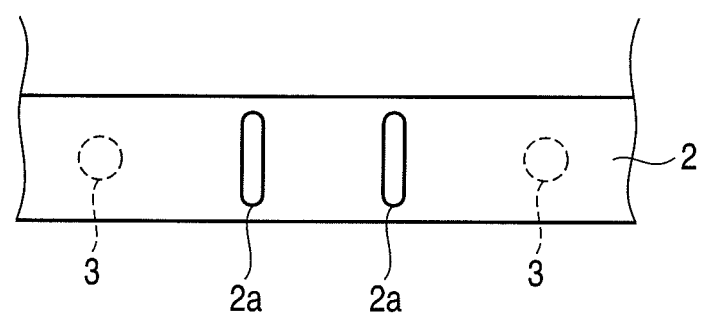
F I G. 9
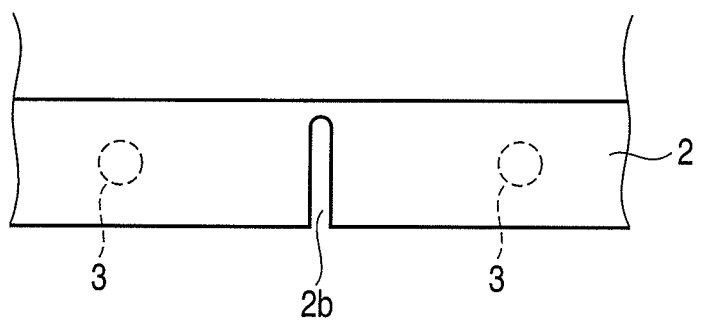
F I G. 10

ELECTRONIC DEVICE

CROSS-REFERENCE TO RELATED APPLICATIONS

This is a continuation of U.S. patent application Ser. No. 12/871,771, filed Aug. 30, 2010, which is based upon and claims the benefit of priority from Japanese Patent Application No. 2009-283168, filed Dec. 14, 2009; the entire contents of each of which are incorporated herein by reference.

FIELD

Embodiments described herein relate generally to an electronic device with a touch panel, and more particularly, to an electronic device, such as a personal digital assistant (PDA) or a personal computer that is provided with a built-in touch sensor formed of a film (hereinafter referred to as a "film sensor").

BACKGROUND

Jpn. Pat. Appln. KOKAI Publication No. 2008-234470 (Patent Document 1) discloses a tough panel in which ends of the lines of a pair of insulating-film side electrodes are connected to ends of insulating-substrate side lines by a conductive adhesive. The touch panel has a slit near a corner of the insulating film and near a connecting portion that electrically connects ends of the insulating-film side wiring and the insulating-substrate side wiring.

The slit of the insulating film prevents stress concentration in the above connection portions, when the touch panel is heated to cause deformation of the insulating film and the insulating substrate due to the difference in coefficient of thermal expansion between the film and the substrate. Namely, the slit functions to absorb deformation of the insulating film to thereby prevent stress concentration in the connection portions. As a result, detachment of the connection portions due to the stress caused by thermal expansion is prevented.

However, since the insulating film expands in all planar directions, stress occurs in, for example, connection portions between the insulating film and another substrate and between the above-mentioned lines. Namely, stress occurs in the two connection portions serving as the insulating film connection portions, whereby the above-mentioned detachment problem occurs. In particular, in the case of a large touch panel, the deformation amount of the insulating film relative to the substrate increases, which means that the problem of detachment between the insulating film and the substrate inevitably becomes conspicuous.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 4 is an exploded perspective view illustrating a film sensor assembly incorporated in the display of the PDA;

FIG. 9 is an enlarged view illustrating part of a first modification of the embodiment, in which long holes are formed in the peripheral portion of the film sensor of FIG. 5; and FIG. 10 is an enlarged view illustrating part of a second modification of the embodiment, in which a notch is formed, instead of the long holes, in the peripheral portion of the film sensor of FIG. 5.

DETAILED DESCRIPTION

Various embodiments will be described hereinafter with reference to the accompanying drawings.

In general, according to one embodiment, a printed circuit board 4 is attached to the film sensor 2 at a plurality of attachment portions 3. Holes 2a are formed in the film sensor 2 between adjacent ones of the attachment portions 3.

Figure 1:
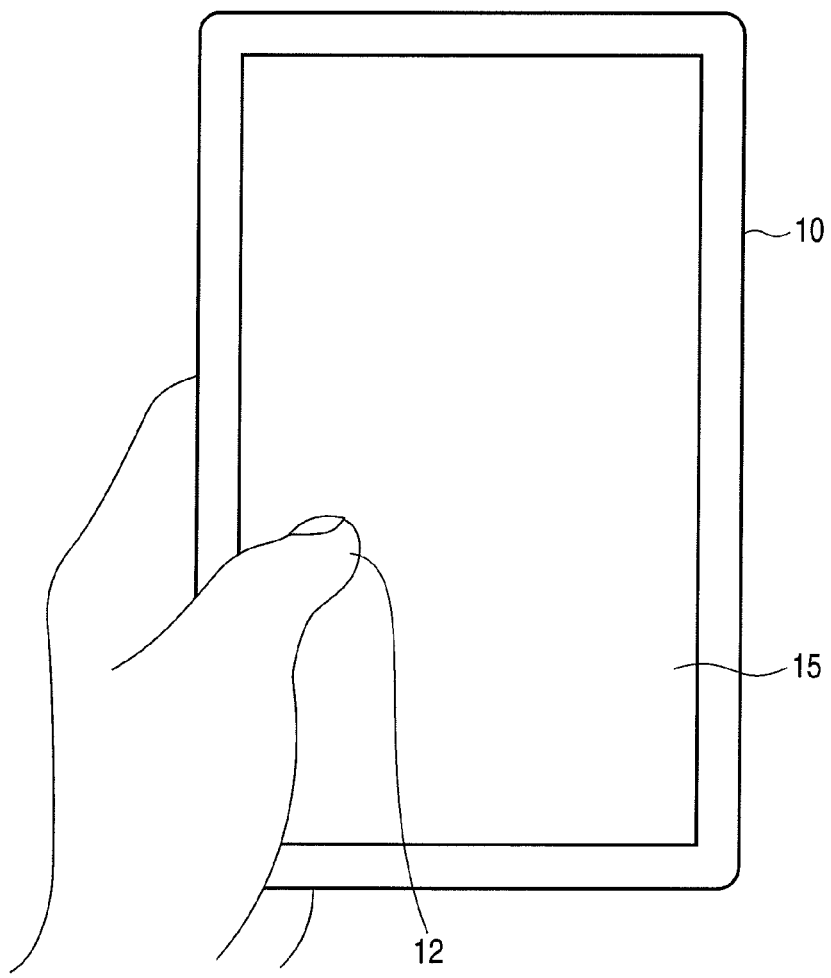
FIG. 1 is a view illustrating an outward appearance of a PDA as an example of en electronic device according to an embodiment of the invention.

FIG. 1 shows an outward appearance of a personal digital assistant (PDA) 10 as one example of an electronic device according to the embodiment.

As shown in FIG. 1, the PDA 10 includes a display 15 that contains a touch sensor (film sensor) in the form of a film. The display 15 provides various operation screens to a user, and functions as a user interface for enabling the user to select an item displayed on a selected screen by touching the item by, for example, a finger 12 or using a touch pen (not shown). The film sensor provided on the surface of the display 15 will be described later.

Figure 2:
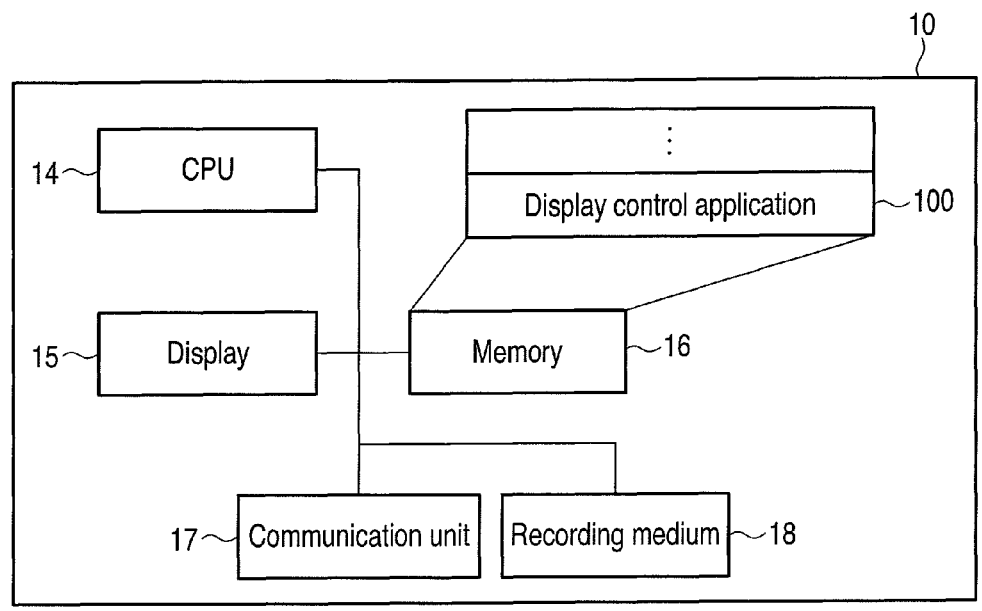
FIG. 2 is a block diagram illustrating the configuration of the PDA of FIG. 1.

FIG. 2 is a block diagram illustrating the configuration of the PDA 10.

As shown in FIG. 2, the PDA 10 comprises a CPU 14 for controlling the devices incorporated in the PDA 10, a display 15 with a film sensor described later, a memory 16, such as a flash memory, for temporarily storing data, a communication unit 17 functioning as a connection interface to be connected to, for example, the Internet, and a recording medium 18, such as an HDD or a flash memory, which has a greater memory capacity than the memory 16.

The CPU 14 loads, in the memory 16, various applications, such as an operating system (OS) and a display control application 100 stored in the recording medium 18, thereby controlling the whole operation of the PDA 10 in accordance with commands supplied via the film sensor of the display 15.

Figure 3:
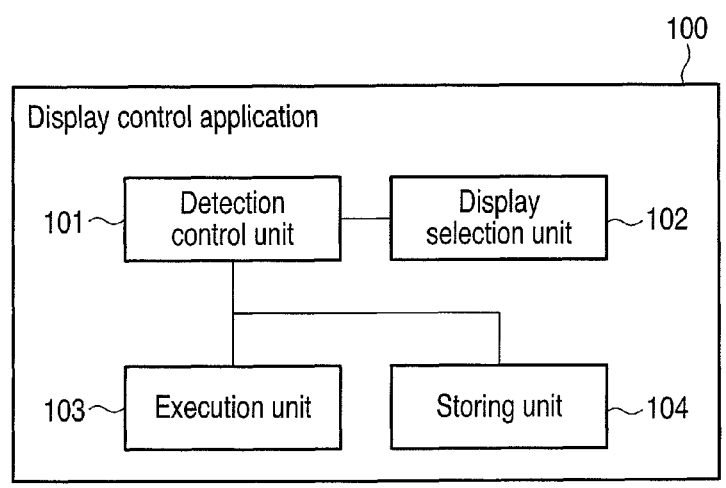
FIG. 3 is a block diagram illustrating the display control application shown in FIG. 2.

As shown in FIG. 3, the display control application 100 comprises a detection control unit 101, a display selection unit 102, an execution unit 103 and a storing unit 104. The detection control unit 101 is connected to the film sensor described later, and detects whether a finger 12 of the user or a touch pen touches an item displayed on the screen of the display 15. When text data is selected on the display 15, the display selection unit 102, for example, highlights the selected text data. The execution unit 103 copies, detects, pastes, cuts or searches for the selected text data. When the execution unit 103 searches for the selected text data, it searches a built-in dictionary or searches the Internet via the communication unit 17. The storing unit 104 stores a display menu and/or item data (an item "copy," an item "delete," an item "paste," an item "cut," an item "search," etc.).

FIG. 4 is an exploded perspective view illustrating a sensor assembly 20 incorporated in the display 15. The sensor assembly 20 comprises a film sensor 2 provided on the surface of the display 15, a printed circuit board 4 attached to the reverse side of the film sensor 2, a spacer 6 and a fixing frame 8.

The film sensor 2 has a structure in which XY patterns (not shown) in a matrix are formed on a rectangular vinyl film, and the ends of the patterns are lead to the edges of the film. A piezo film sensor, for example, is known as the film sensor 2. The film sensor 2 is formed of, for example, a polyethylene-based film material.

The printed circuit board 4 is L-shaped and provided along a pair of short and long sides of the film sensor 2. The circuit board 4 has a circuit pattern (not shown) on a surface thereof that faces the XY patterns of the film sensor 2, and has an IC chip (not shown) mounted on the other surface. The printed circuit board 4 is formed of glass epoxy.

When attaching the printed circuit board 4 to the film sensor 2, the former is adhered to the sides of the latter so that the circuit pattern of the former is connected to the XY patterns of the latter via a conductive adhesive. As a result, the IC chip on the printed circuit board 4 is electrically connected to the XY patterns.

The spacer 6 is also L-shaped, and is provided along the other sides of the film sensor 2. The fixing frame 8 is formed rectangular to cover the reverse sides of the printed circuit board 4 and the spacer 6.

Namely, the sensor assembly 20 has a structure in which the fixing frame 8 is adhered to the reverse surface of the periphery of the film sensor 2, with the printed circuit board 4 and the spacer 6 interposed therebetween.

The spacer 6 is provided to eliminate the step that is formed between the film sensor 2 and the printed circuit board 4 when these two elements are adhered to each other.

As shown in FIG. 1, the PDA 10 constructed as above contains all devices in its rectangular housing. Therefore, when the PDA 10 is turned on, the temperature in the housing increases with time. In particular, the backlight of the liquid crystal display (LCD), for example, is considered a main heat source.

When the PDA 10 is heated, the film sensor 2 and the printed circuit board 4 of the sensor assembly 20 are also heated, whereby they are thermally expanded to their respective degrees corresponding to their respective thermal expansion coefficients. Since the film sensor 2 and the printed circuit board 4 are electrically connected at several connection portions via the conductive adhesive as mentioned above, stress will concentrate on the connection portions due to the difference between the thermal expansion coefficients, whereby the connected portions may well be detached.

Figure 6:
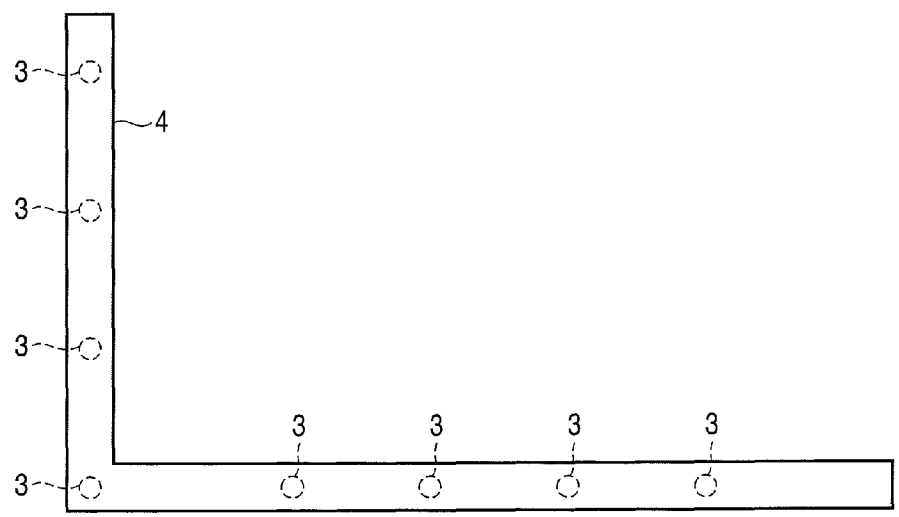
FIG. 6 is a printed circuit board incorporated in the film sensor assembly of FIG. 4.

More specifically, as shown in FIG. 6, the L-shaped printed circuit board 4 of the embodiment is electrically connected to the film sensor 2 at a plurality of connection portions via a conductive adhesive 3. The connection portions will now be denoted by reference number 3. The connection portions 3 are predetermined in accordance with the circuit pattern of the printed circuit board 4.

The film sensor 2 of the embodiment is formed of a vinyl film, and the printed circuit board 4 of the embodiment is formed of glass epoxy. Thus, the film sensor 2 and the printed circuit board 4 connected to each other at the connection portions 3 are formed of materials having different coefficients of thermal expansion.

Accordingly when the two members are simultaneously heated to a certain temperature, a different may occur in the amount of deformation between the members due to the different coefficients of thermal expansion. In the combination of the materials employed in the embodiment (i.e., the combination of vinyl and glass epoxy), when they are heated under the same conditions, the film sensor is thermally expanded by a greater ratio than the printed circuit board 4.

Namely, in this case, the film sensor 2 is thermally expanded more greatly than the printed circuit board 4 between adjacent ones of the connection portions 3 arranged along the printed circuit board 4. Accordingly, stress concentrates in the connection portions 3. When the on and off operations of the PDA 10 are repeated to thereby repeat thermal expansion and contraction, the above-mentioned stress concentration causes shearing force to be exerted on the connection portions 3, with the result that the connection portions 3 will be detached at worst.

Figure 5:
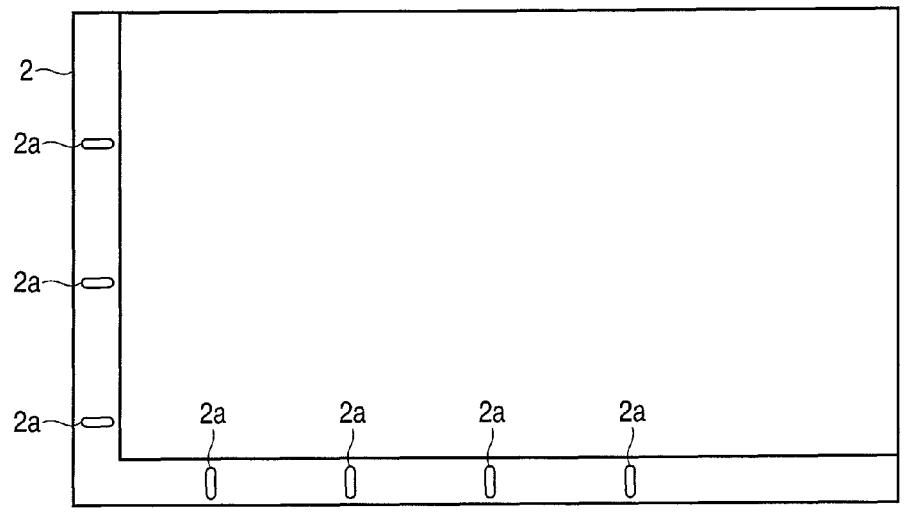
FIG. 5 is a schematic view illustrating a film sensor incorporated in the film sensor assembly of FIG. 4.
Figure 7:
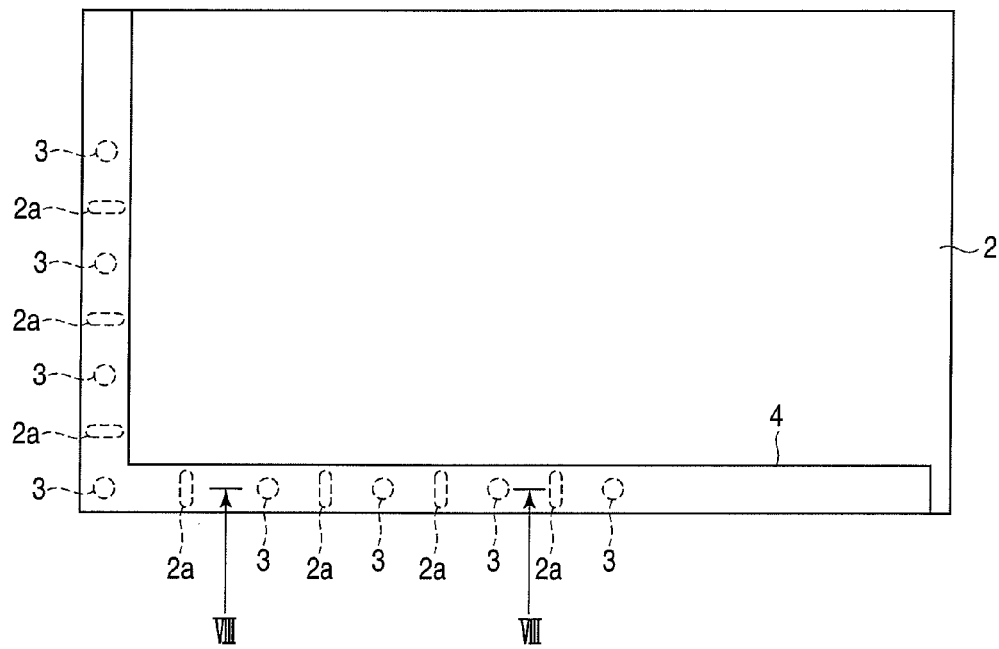
FIG. 7 is a schematic view illustrating a structure seen from the reverse side, the structure being obtained by attaching the printed circuit board of FIG. 6 to the peripheral portion of the film sensor of FIG. 5.

To avoid this, a plurality of long holes 2a (see FIG. 5) for leaking the above-mentioned stress are formed in the peripheral portion of the film sensor 2. As shown in FIG. 7, the long holes 2a are formed so that when the printed circuit board 4 is attached to a peripheral portion of the film sensor 2, each of the long holes is positioned at substantially the center of the corresponding adjacent connection portions 3.

Further, the length of each long hole 2a (which is elongated along the width of the printed circuit board 4) is designed to a value that enables deformation of the film sensor 2 to be sufficiently absorbed when a tensile force or a compression force is exerted on the film sensor 2 between the corresponding adjacent connection portions 3. More specifically, the long holes 2a are at least set longer than the diameter of the connection portions 3.

The long holes 2a may have any arbitrary shape. However, it is desirable that the periphery of each hole is curved so as not to be sheared when the film sensor 2 is deformed as a result of stress concentration.

Figure 8:
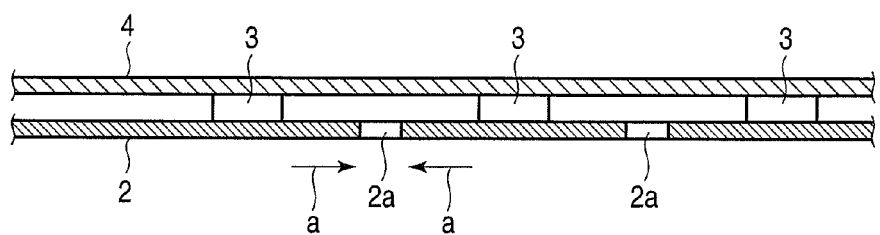
FIG. 8 is a sectional view taken along line VIII-VIII of FIG. 7.

Referring now to FIG. 8, a more detailed description will be given of the function of the long holes 2a of the film sensor 2.

FIG. 8 is a sectional view illustrating a state in which the L-shaped printed circuit board 4 of glass epoxy is connected to a peripheral portion of the film sensor 2 of vinyl via the conductive adhesive 3 at a plurality of connection portions.

When the sensor assembly 20 constructed as above is heated, the film sensor 2 greater in coefficient of thermal expansion than the printed circuit board 4 is more greatly expanded and deformed than the printed circuit board 4. At this time, attention will now be paid to the portions of the two members 2 and 4 located between a certain pair of adjacent connection portions 3. A compression force is exerted on the film sensor 2 between the certain pair of adjacent connection portions 3 in the directions indicated by arrows a.

When no long holes 2a are formed in the film sensor 2 unlike the embodiment, the above-mentioned compression force causes stress in the two connection portions 3. In contrast, the embodiment employs a long hole 2a formed between the two connection portions 3. In this case, the long hole 2a is deformed to absorb the compression force to narrow the width of the long hole 2a, whereby no stress occurs in the two connection portions 3.

On the other hand, when the sensor assembly 20 is cooled from this state, the film sensor 2 and the printed circuit board 4 both contract. Contraction of the film sensor 2 having a relatively high coefficient of contraction can be compensated for if the long holes 2a are widened, with the result that no stress occurs in the two connection portions 3.

As described above, in the embodiment, since the above-mentioned long holes 2a are formed in the peripheral portion of the film sensor 2 adhered to the printed circuit board 4, stress concentration in the connection portions 3 due to thermal expansion can be prevented, thereby enabling the connection state of the film sensor 2 and the printed circuit board 4 to be maintained in good condition. In particular, in the embodiment, the connection state of the film sensor 2 and the printed circuit board 4 can be improved and the additional cost can be suppressed simply by forming a plurality of long holes 2a in the peripheral portion of the film sensor 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

FIG. 9 shows a first modification of the embodiment.

In this modification, two long holes 2a are formed between each pair of adjacent connection portions 3 provided along the peripheral portion of the film sensor 2. Thus, when the distance between each pair of adjacent connection portions 3 is long, two or more long holes may be formed between them.

FIG. 10 shows a second modification of the embodiment, in which notches 2b are formed in place of the long holes 2a. Thus, the means for avoiding stress concentration due to thermal expansion are not limited to holes.

Further, although the above-described embodiments and modifications employ one or more long holes 2a (or one or more notches 2b) are formed between every pair of adjacent connection portions 3, the invention is not limited to this. If the distance between each pair of adjacent connection portions 3 is short, no long holes 2a (no notches 2b) may be formed between them.

What is claimed is:

1. An electronic device comprising:
a housing;
a circuit board in the housing, equipped with an electronic component;
a film sensor on the circuit board, connected to the circuit board at a plurality of connection portions, the film sensor comprising a plurality of hole portions, each of the hole portions located entirely in a region overlapped by the circuit board of the film sensor between two adjacent connection portions of the plurality of connection portions, respectively, and
a spacer,
wherein the plurality of connection portions are arranged in a first direction, each of the connection portions having a length in a second direction orthogonal to the first direction, and
each of the hole portions is a long hole extending beyond both sides of the connection portions in the second direction,
the film sensor has a rectangular shape, comprising a first side, a second side, a third side and a fourth side;
the circuit board has an L-shape along the first and second sides of the film sensor; and
the spacer has an L-shape along the third and fourth sides of the film sensor to keep the film sensor and the circuit board substantially in parallel when the film sensor is thermally expanded.

2. The electronic device of Claim 1, wherein each of the hole portions is located in a center of the two adjacent connection portions.

3. The electronic device of Claim 1, wherein another hole portion identical with the hole portion is located between the two adjacent connection portions.

4. The electronic device of Claim 1, wherein the film sensor and the circuit board are electrically connected to each other via a conductive adhesive.

5. The electronic device of claim 1, further comprising a fixing frame which has a frame shape facing the L-shaped circuit board and the L-shaped spacer from an opposite side of the film sensor.

6. A structure comprising:
a circuit board equipped with an electronic component;
a film sensor on the circuit board, connected to the circuit board at a plurality of connection portions, the film sensor comprising a plurality of hole portions, each of the hole portions located entirely in a region overlapped by the circuit board of the film sensor between two adjacent connection portions of the plurality of connection portions, respectively, and
a spacer,
wherein the plurality of connection portions are arranged in a first direction, each of the connection portions having a length in a second direction orthogonal to the first direction,
each of the hole portions is a long hole extending beyond both sides of the connection portions in the direction,
the film sensor has a rectangular shape, comprising a first side, a second side, a third side and a fourth side;
the circuit board has an L-shape along the first and second sides of the film sensor; and
the spacer has an L-shape along the third and fourth sides of the film sensor to keep the film sensor and the circuit board substantially in parallel when the film sensor is thermally expanded.

7. The structure of Claim 6, wherein each of the hole portions is located in a center of the two adjacent connection portions.

8. The structure of Claim 6, wherein another hole portion identical with the hole portion is located between the two adjacent connection portions.

9. The structure of Claim 6, wherein the film sensor and the circuit board are electrically connected to each other via a conductive adhesive.

10. The structure of claim 6, further comprising a fixing frame which has a frame shape facing the L-shaped circuit board and the L-shaped spacer from an opposite side of the film sensor.

* * * * *